Patented Aug. 17, 1948

2,447,177

UNITED STATES PATENT OFFICE 2,447,177

GUANAMINE COMPOUNDS

Adolf Grün, deceased, late of Basel, Switzerland, by Franz Grün, administrator, Basel, Switzerland, assignor to J. R. Geigy A. G., Basel, Switzerland No Drawing. Application February 9, 1948, Serial No. 7,293. In Switzerland April 25, 1939

1 Claim. (Cl. 260—249.5)

The present application is concerned, more particularly, with those triazino compounds (2-substituted guanamines) which have the following formula

in which R is an olefinic aliphatic radical, G is a guanamine radical, G being linked to R at the 2 carbon atom of the triazine ring by a carbon to carbon bond. Illustrative compounds of this character are inter alia the following: β-carboxyacryloguanamine, methylene-β-carboxypropionoguanamine and the like.

The invention is based upon the observation that, contrary to expectations in view of the prior art experiences with this type of compound, it is possible to obtain the aforesaid 2-substituted guanamines, which may also be regarded as 2:4-diamino-1:3:5-triazino compounds, very readily and in smooth manner by the reaction under suitable conditions between biguanide and the corresponding carboxylic acid halide. In this connection, it is preferred to carry out the reaction in a medium containing a non-caustic acid-binding agent.

The compounds of the present invention may serve as intermediate products for the manufacture of medicinal and therapeutic substances and dyestuffs, as well as textile assistants, softening agents, etc.

The present application is in part a continuation of copending application S. N. 434,624, filed March 13, 1942, and entitled "Manufacture of 2:4-diamino-1:3:5-triazines," now Patent No. 2,437,691, issued March 16, 1948. The appended claim corresponds to claim 17, of the last-named application.

The invention is illustrated, but not limited, by the following examples, the parts being by weight except as otherwise indicated.

Example 1

11 parts of biguanide are dissolved in 400 parts of toluene, 12 parts of anhydrous soda (sodium carbonate) are added and gradually combined, while stirring at 50–60° C., with 15 parts of β-carbomethoxyacrylyl chloride dissolved in the same quantity of toluene. The temperature is raised gradually to, and then maintained for 16 hours at, 110° C., after which it is allowed to drop to 80° C. The solution is filtered off from the salt residue and concentrated in vacuo. The resulting product is β-carboxyacryloguanamine

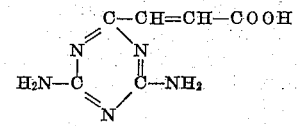

which does not melt but becomes brown at 335° C.

Example 2

73 parts of methyl-2-ethylhexyl malate were added to 25 parts of biguanide dissolved in 100 parts of methanol. The reaction mixture became warm and the product began to precipitate immediately. The yield of the crude biguanide salt of β-carboxyacryloguanamine was 82.5%. This product was dissolved in water and precipitated by acidifying to a pH of about 4.0. After filtering and washing, the guanamine was purified by dissolving in sodium hydroxide and reprecipitating with acid. The yield of pure product

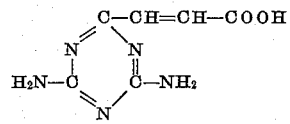

which did not melt but became brown at 335° C., was 75%. Maleoguanamine, the corresponding ditriazine, was absent.

Example 3

The same procedure as given in Example 2 was followed using 25 parts of biguanide, 51.6 parts of ethyl fumarate and 100 parts of methanol. The yield of crude guanamine was 94%, which after dissolving in caustic soda and reprecipitating with acid, gave about 87% of purified product

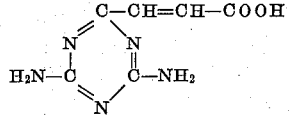

which did not melt but becomes brown at 335° C. The fumaroguanamine, the corresponding ditriazine, was absent.

Example 4

310 parts of biguanide were added to 458 parts of sodium methyl malate dissolved in 1200 parts of methanol. The reaction mixture was then stirred for about 12 hours, even though the product appeared to be completely precipitated in about three hours. The crude sodium β-carboxyacryloguanamine was filtered from the solvent and after drying amounted to 203 parts. The filtrate was evaporated to a heavy syrup and diluted with about 3000 parts of water and then acidified to a pH of about 4.0. The precipitated β-carboxyacryloguanamine

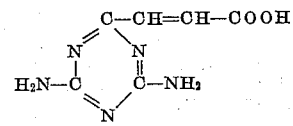

was filtered, washed with water, and after drying amounted to 162 parts. Thus the over-all yield of β-carboxyacryloguanamine calculated on the basis of free acid and the sodium salt was 66%.

Example 5

37.2 parts of diethyl itaconate were caused to react with 40 parts of biguanide in about 140 parts of methanol. Within an hour the guanamine began to precipitate and the reaction mixture was allowed to stand overnight. The product was removed by filtration and then extracted with several portions of water, in order to remove the biguanide salt of methylene-β-carboxypropionoguanamine

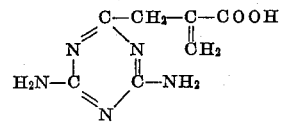

which was recovered in a yield of about 11% from the water solution by acidification to a pH of about 4.0. The yield of itaconoguanamine

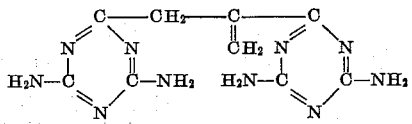

which was precipitated from the above water extraction was about 42%.

Having thus disclosed the invention, what is claimed is:

Guanamines having the following formula

in which R is an olefinic aliphatic radical, G is a guanamine radical, G being linked to R at the 2 carbon atom of the triazine ring by a carbon to carbon bond.

FRANZ GRÜN,
*Administrator of the Estate of Adolf Grün, Deceased.*